United States Patent [19]

Chenausky et al.

[11] 4,443,877
[45] Apr. 17, 1984

[54] UNIFORMLY EXCITED RF WAVEGUIDE LASER

[75] Inventors: Peter P. Chenausky, Avon; Leon A. Newman, South Windsor, both of Conn.

[73] Assignee: United Technologies Corporation, Hartford, Conn.

[21] Appl. No.: 344,702

[22] Filed: Feb. 1, 1982

[51] Int. Cl.³ .............................................. H01S 3/09
[52] U.S. Cl. ...................................... 372/38; 372/64; 372/82
[58] Field of Search ...................... 372/82, 64, 38, 83

[56] References Cited

U.S. PATENT DOCUMENTS 4,169,251 9/1979 Laakmann .............................. 372/64
4,352,188 9/1982 Griffith .................................. 372/82
4,363,126 12/1982 Chenausky et al. ................... 372/38

Primary Examiner—James W. Davie
Attorney, Agent, or Firm—Eric W. Petraske

[57] ABSTRACT

An RF excited gas laser having an optical cavity that is also a resonant cavity in the RF region is improved by the spacing of discrete inductors at fixed points along the cavity so that the problem present in the prior art of nonuniform excitation of the discharge along the cavity is eliminated and the discharge is essentially uniform throughout the cavity volume.

3 Claims, 6 Drawing Figures

UNIFORMLY EXCITED RF WAVEGUIDE LASER

The Government has rights in this invention pursuant to Contract No. DAAK80-79-C-0302 awarded by the Department of the Army.

TECHNICAL FIELD

The field of the invention is that of RF excited waveguide lasers.

BACKGROUND ART

In the art of RF discharge waveguide lasers, summarized in U.S. Pat. No. 4,169,251, issued to Laakman on Sept. 25, 1979, the length of the waveguide fed by a single connector has been limited to $\lambda_m/4$ where $\lambda_m$ is the RF wavelength of the power supply feed in the dielectric material adjacent to the optical cavity. The reason for this limitation has been that the power fed into the waveguide travels from the feed point to the ends and is there reflected causing interference between a return wave and a traveling wave, so that the field along the discharge length is highly nonuniform. The only method known to the prior art for extending the length of the waveguide, and thus increasing the power which may be obtained from the laser, has been to feed power into the optical cavity at more than one point. The problem with this approach has been that great care is needed to adjust the phases at different feed points so that destructive interference between the several feed points does not occur. The Laakman patent referred to above teaches the necessity for multiple feeds and also the necessity for reactive termination of the waveguide ends.

An RF excited waveguide laser upon which the subject invention of this patent application is an improvement is illustrated in patent application Ser. No. 214,858, now U.S. Pat. No. 4,363,126 assigned to the assignee hereof and incorporated herein by reference, which discloses an RF excited discharge laser having a single feed point and an inductor connected in parallel with the RF electrodes so that the optical cavity is an RF tuned circuit. This application teaches away from the subject invention in that it also states that the length of a RF laser is limited to approximately $\lambda_m/4$.

DISCLOSURE OF INVENTION

The problem addressed by the subject invention is that of increasing the length of the discharge of an RF excited waveguide laser without resorting to the use of multiple feed points for RF power or of reactive termination of the waveguide ends. This problem is solved by connecting a number of discrete inductors between the RF electrodes in such a manner that voltage variation along the discharge electrode is reduced within acceptable limits.

BEST MODE FOR CARRYING OUT THE INVENTION

Figure 2:
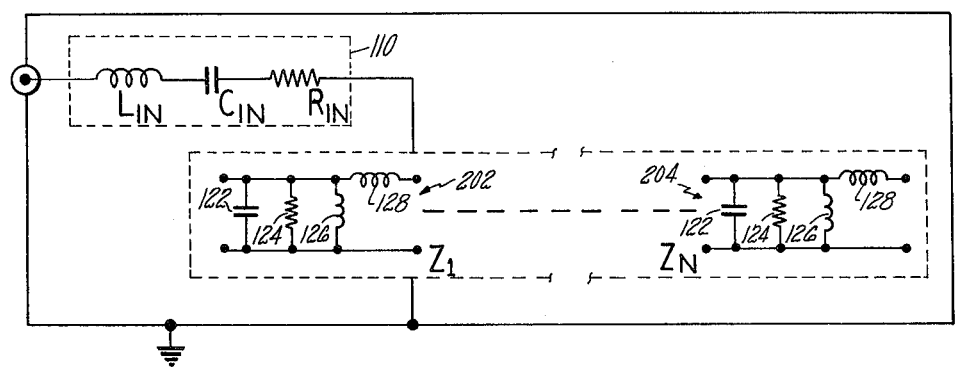
FIG. 2 shows a schematic diagram of a laser constructed according to the present invention.

FIG. 2 illustrates a schematic diagram of a laser constructed according to the present invention, in which circuit 110 is a complex input impedance circuit represented by a series inductor, capacitor and resistor combination. This input circuit is connected to the effective electrical representation of the optical cavity given by a series of complex impedances $Z_i$, of which the first $Z_1$ (circuit 202) and the last $Z_n$ (circuit 204) are shown. $Z_i$, the impedance of the ith circuit, is further broken down into capacitor 122 in parallel with resistor 124, inductor 126 and series inductor 128. If it were not for parallel inductor 126, this would be a representation of a lossy transmission line and the results would be the well known transmission line results. This circuit, however, is different from the lossy transmission line by the addition of the several discrete inductors 126. Physically, inductors 126 are discrete circuit elements connected between the two electrodes between which the RF discharge is established and the series inductance 128 is the inductance formed between the two electrodes and whatever stray inductance is present in the circuit.

Figure 1:
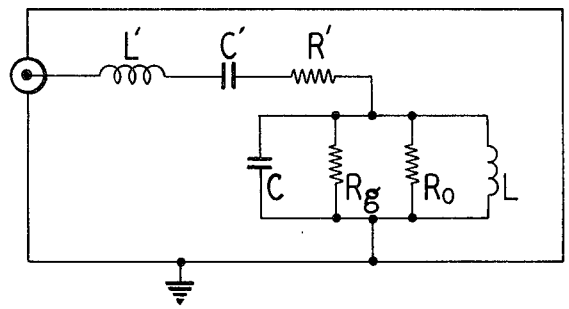
FIG. 1 shows a schematic diagram of a prior art waveguide laser.
Figure 5:
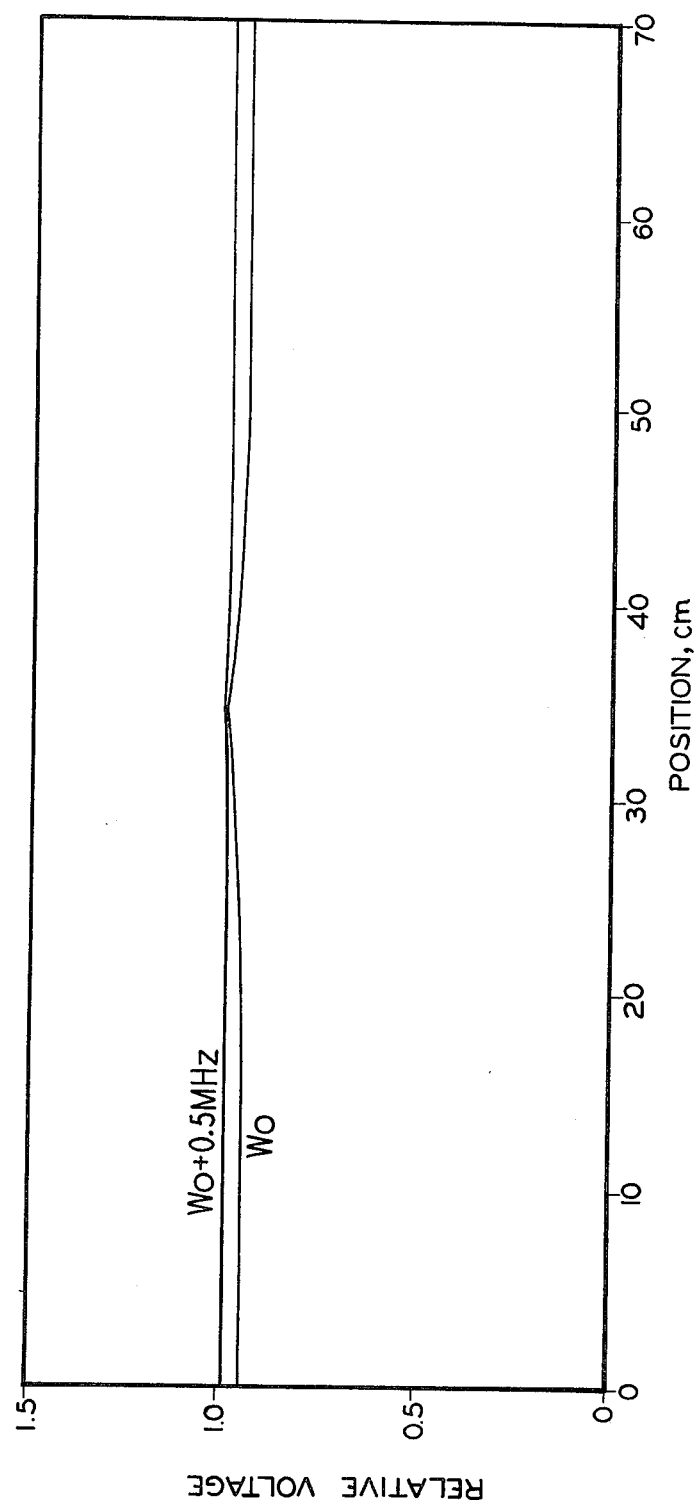
FIG. 5 shows a graph illustrating theoretical distributions at resonance and slightly above resonance from a laser having uniformly distributed inductance.
Figure 6:
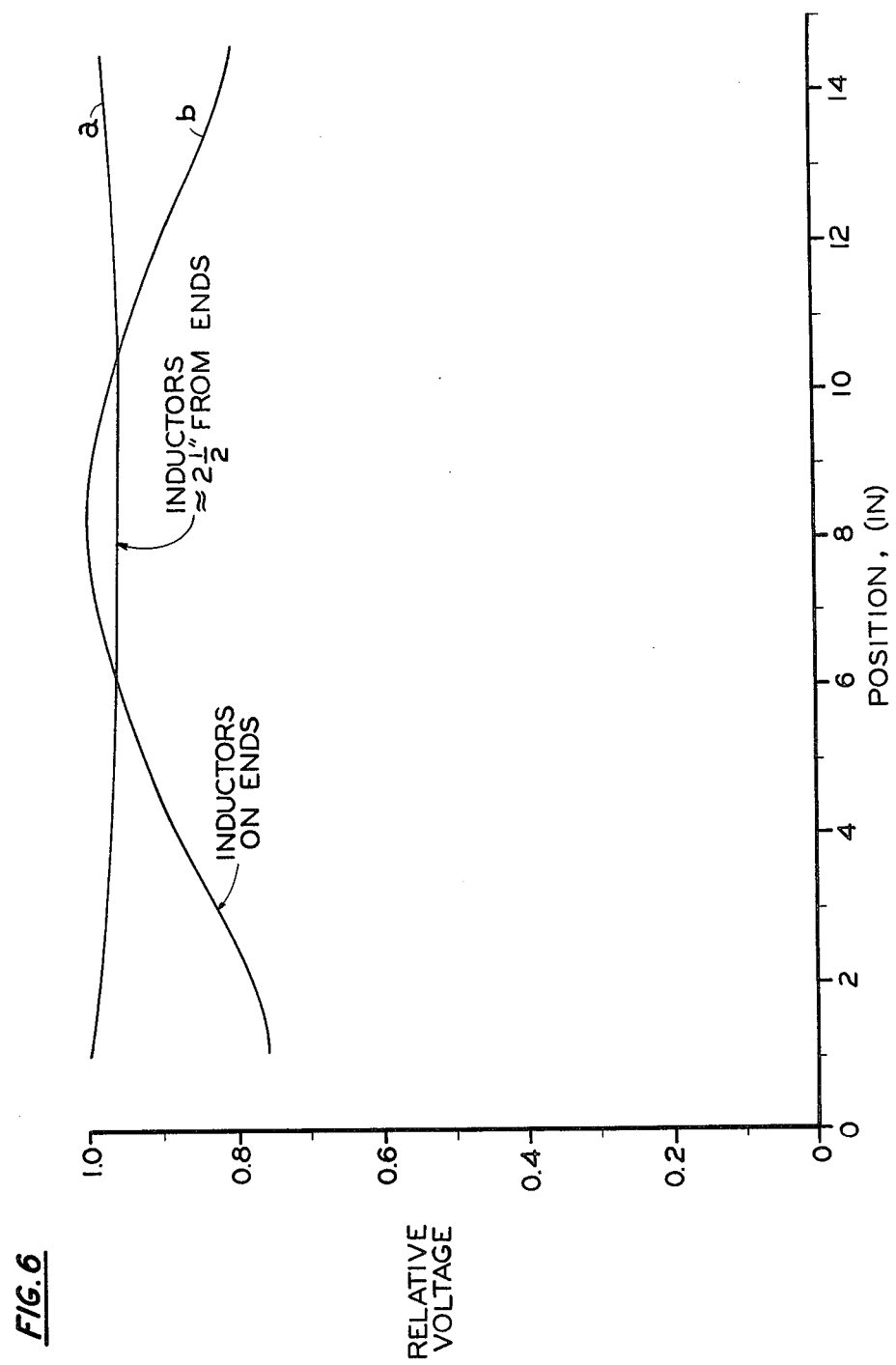
FIG. 6 shows experimental voltage distribution for discrete inductors.

FIG. 1 illustrates a schematic diagram of the laser disclosed in copending application Ser. No. 214,858, showing an equivalent circuit of the optical waveguide, in which L is either a single inductor connected between the two electrodes or, in a special case, is the gas enclosure to which the electrodes are attached (FIGS. 5, 6 of the copending application).

For convenience in analyzing the problem of how the voltage is distributed along the waveguide electrodes, it will be assumed that there is a single RF feed point at the midpoint of the electrode and that the ends of the waveguide are both open-ended, i.e. Z is infinite. Let $X=0$ be one end of the waveguide, $X=L$ be the midpoint and $X=2L$ be the end. For normalization, the voltage at the midpoint will arbitrarily be set to equal one. It is possible to solve the electromagnetic equations for this problem analytically, and the solution is shown in equation (1):

$$|V(x)| = \sqrt{\frac{\sinh^2\alpha x + \cos^2\beta x}{\sinh^2\alpha L + \cos^2\beta L}} \tag{1}$$

where $$\alpha = \sqrt{r}\ \cos(\theta/2 + \pi K)$$
$$\beta = \sqrt{r}\ \sin(\theta/2 + \pi K) \qquad K = 0, 1$$

and $$r = \sqrt{\left(\omega L_2\left(\frac{1}{\omega L_1} - \omega C\right)\right)^2 + \left(\frac{\omega L_2}{R}\right)^2}$$

$$\theta = \arctan \omega L_2/R/(\omega L_2(1/\omega L_1 - \omega C))$$

An assumption in the derivation of equation (1) is that the parallel inductors 126 are spaced sufficiently closely together that the solution is equivalent to that of a uniformly distributed inductance.

For purposes of illustration, this rather complex equation may be simplified by taking the point of resonance, i.e. the driving frequency for which the quantity $1/\omega L_1 = \omega C$, where $L_1$ and $C$ are the total capacitance and total inductance for the discharge structure. In that case, the quantity $\alpha$ equals the quantity $\beta$ equals the square root of the quantity $\omega L_2/2R$ and is constant so that $V(L)=1$ and $$V(O) = 1/\sqrt{\sinh^2(L\sqrt{\omega L_2/2R}) + \cos^2\sqrt{(L\omega L_2/2R)}}.$$

This equation sets a limit on the degree of uniformity that can be achieved as a function of the shape of the electrodes, which is reflected in the series inductance $L_2$, as a function of the length of the waveguide and of the resistance of the gaseous discharge. In particular, the voltage distribution along the electrodes can be kept within 10% of the voltage at the feed point if the following inequality holds:

$$(\text{Total length}/2) \cdot \frac{\omega L_2}{2R} < 0.75 \quad (2)$$

In an illustrative embodiment of the invention, the basic laser of the copending application is improved according to the principles of the present invention with circuit parameters: $L_1 = 200\text{nh} - CM$, $C = 6\text{pf}/CM$, $L_2 = 2.4\text{nh}/CM$, $R = 3.5\ K\Omega - CM$, $W_0 = 145.28$ MHz. This was achieved by taking the prior art laser with its aluminum electrodes, alumina dielectric, physical length of 34 centimeters and adding to it ten inductors uniformly distributed to give the specified value of $L_1$.

Figure 4:
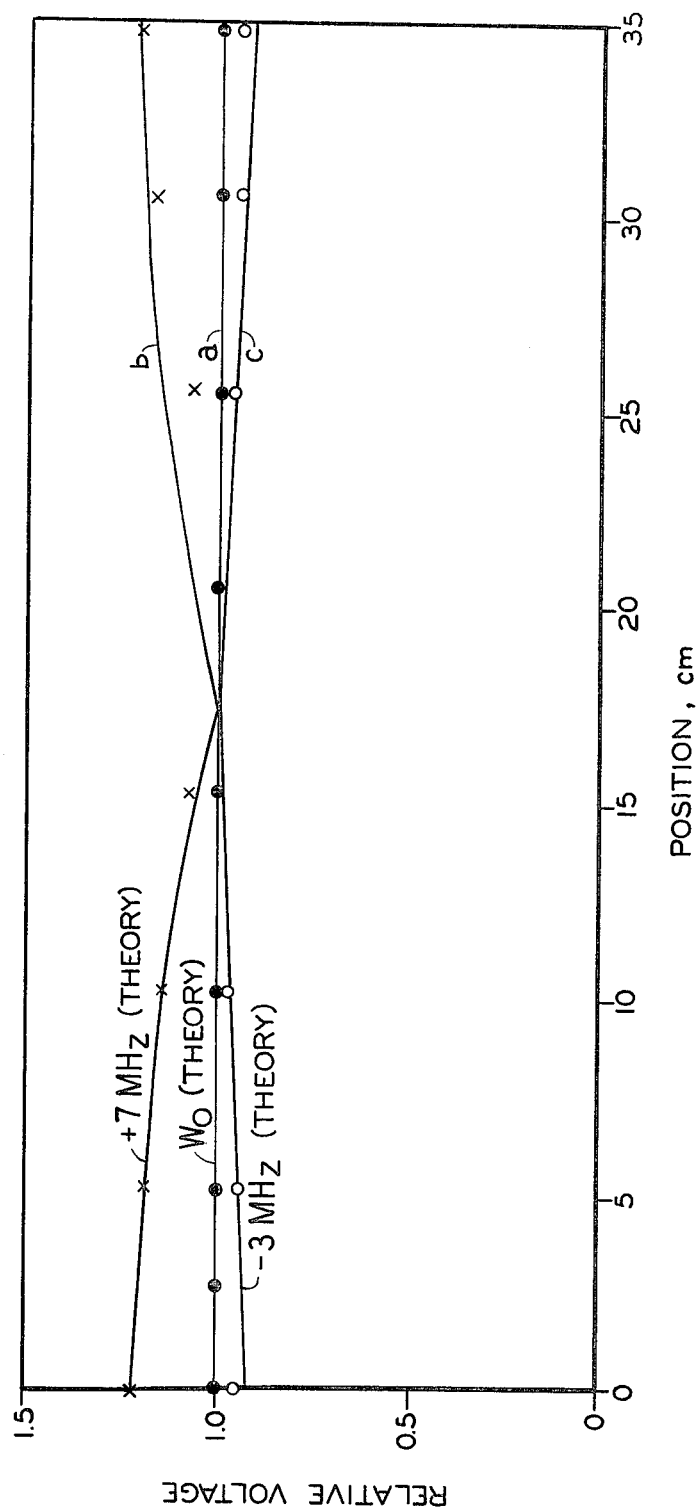
FIG. 4 shows a graph illustrating the comparison between theoretical and experimental results for voltage distribution along a waveguide laser having uniformly distributed inductance.

FIG. 4 shows a comparison of the theoretical values of the voltage distribution calculated according to equation (1) with experimental voltage values obtained by substituting a number of carbon resistors for the gaseous resistance, measurements were made at the resonant frequency (Curve a), a frequency 7 MHz above resonance (Curve b) and a frequency 3 MHz below resonance (Curve c). The excellent agreement between the theoretical curves and the plotted experimental values is striking conformation of the foregoing analysis. It is noteworthy that the length $L_2$ allowed by the rule of thumb given above in equation (2) is a total length of 80 centimeters which is almost equal to $\lambda_m$, the RF wavelength in the dielectric, a striking improvement over the prior art teaching that the maximum physical length for a laser was approximately $\lambda_m/4$.

It should be noted in FIG. 4 that at a frequency slightly above the resonant frequency (Curve b), the voltage distribution along the waveguide rises as one departs from the midpoint so that judicious selection of frequency can cancel out the slight drop in voltage that occurs at resonance (Curve a). An illustration is given in FIG. 5 in which theoretical values for the voltage distribution are illustrated at resonance and at resonance plus one-half a megahertz. It can be seen that the voltage distribution at one-half megahertz above resonance has been reduced from a difference of slightly over 5% between the midpoint and the end to a difference of 1%. The use of this technique of adjusting the frequency together with appropriate variation of the input impedance to the laser as taught by the prior art application can result in an effective length that is even greater than $\lambda_m$. Convenient ranges for tuning off resonance are plus and minus five percent.

Figure 3:
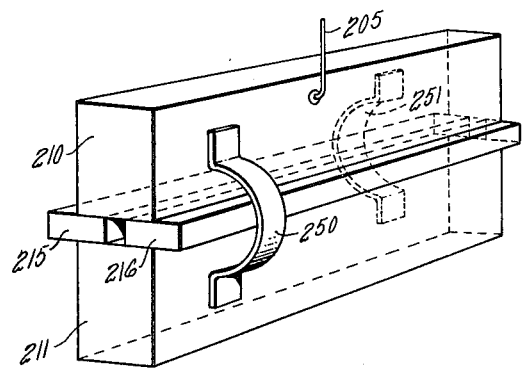
FIG. 3 shows a pictorial view of a subject laser.

The foregoing analysis was based on an assumption that the parallel inductance was distributed substantially uniformly along the waveguide. It is a striking discovery that it is possible to achieve substantially uniform voltage distribution with very few discrete inductors. In particular, FIG. 3 illustrates an embodiment of the invention in which aluminum electrodes 210 and 211 are 34 cm long, defining a waveguide between those electrodes and alumina spacers 215 and 216 that has that physical length and corresponds to $\lambda_m/2$. This electrode-spacer arrangement is the same as that used for the embodiments previously described. RF power is applied through lead 205 to a single feed point at the center of electrode 210, the input impedance-matching circuit being omitted from the drawing. The voltage distribution along the waveguide is modified by the addition of only two parallel inductors 250 and 251, which are single-turn coils formed from copper straps and spaced 21 cm apart.

The parallel inductance of this pair of coils was approximately ten nanohenries. The coils were spaced on opposite sides of the waveguide in this embodiment, for the greatest degree of symmetry, but the use of a pair of coils on one side of the waveguide or of four coils symmetrically placed may also be employed. The resultant normalized experimental voltage distribution along the waveguide is plotted in Curve a of FIG. 6, along with the voltage distribution produced when the indicators are attached to the ends of the waveguide, as taught by the prior art (Curve b). The dramatic improvement in the voltage distribution of the embodiment constructed according to the present invention, compared with the distribution of the prior art inductor placement indicates that considerable improvement in power may be obtained from RF waveguide lasers by applying the principles of this invention.

Although the embodiments disclosed above have employed inductors that were symmetric and/or uniform, it is not necessary that strict uniformity be employed. For example, it may be convenient to employ a number of inductors of varying value in order to compensate for changing capacitance near the ends of the electrode and such a nonuniform distribution is part of the subject invention.

We claim:

1. A radio frequency-excited gas laser comprising:
   an optical resonant cavity having an axis passing therethrough and first and second electrodes disposed on opposite sides thereof and a lasing gas therein, said optical cavity having a cavity capacitance;
   radio frequency means having an output impedance and being connected to said electrodes at a single feed point for establishing a radio frequency electric discharge of a predetermined driving frequency through said lasing gas, whereby optical radiation is resonated in said optical cavity, said discharge having a discharge resistance in parallel with said cavity capacitance, forming a cavity impedance that is a complex number;
   a plurality of inductive elements having a predetermined cavity inductance connected between said electrodes in parallel with said discharge resistance and cavity capacitance to form an electrical resonant circuit having a complex RLC impedance and a predetermined resonant frequency; and an input impedance circuit connected to at least one of said electrodes and to said radio frequency means, said input impedance circuit having a complex impedance the imaginary part of which has a predetermined relationship to the imaginary part of said cavity impedance at said driving frequency; characterized in that:

said plurality of inductive elements includes a first set having at least one inductive element disposed between said electrodes a first predetermined distance along said axis from a first end of said waveguide and a second set having at least one inductive element disposed betwen said electrodes a second predetermined distance along said axis from a second end of said waveguide opposite said first end.

2. A laser according to claim 1, further characterized in that said driving frequency is offset from said resonant frequency by a predetermined amount such that voltage between said first and second electrodes is distributed substantially uniformly along said first and second electrodes and in that said imaginary part of said complex impedance of said input impedance said imaginary part of said cavity impedance.

3. A laser according to claim 2, further characterized in that said driving frequency is less than 1.05 times said resonant frequency and greater than 0.95 times said resonant frequency.

* * * * *